(No Model.)

W. H. SOUTHWARD.
ROTARY SULKY HARROW.

No. 300,151. Patented June 10, 1884.

WITNESSES:

INVENTOR:
W. H. Southward
BY Munn & Co
ATTORNEYS.

United States Patent Office.

WILLIAM HENRY SOUTHWARD, OF MENDON, OHIO.

ROTARY SULKY-HARROW.

SPECIFICATION forming part of Letters Patent No. 300,151, dated June 10, 1884.

Application filed September 27, 1883. (No model.)

*To all whom it may concern:*

Be it known that I, WILLIAM HENRY SOUTHWARD, of Mendon, in the county of Mercer and State of Ohio, have invented a new and useful Improvement in Rotary Sulky-Harrows, of which the following is a full, clear, and exact description.

Reference is to be had to the accompanying drawings, forming a part of this specification, in which similar letters of reference indicate corresponding parts in all the figures.

Figure 1:
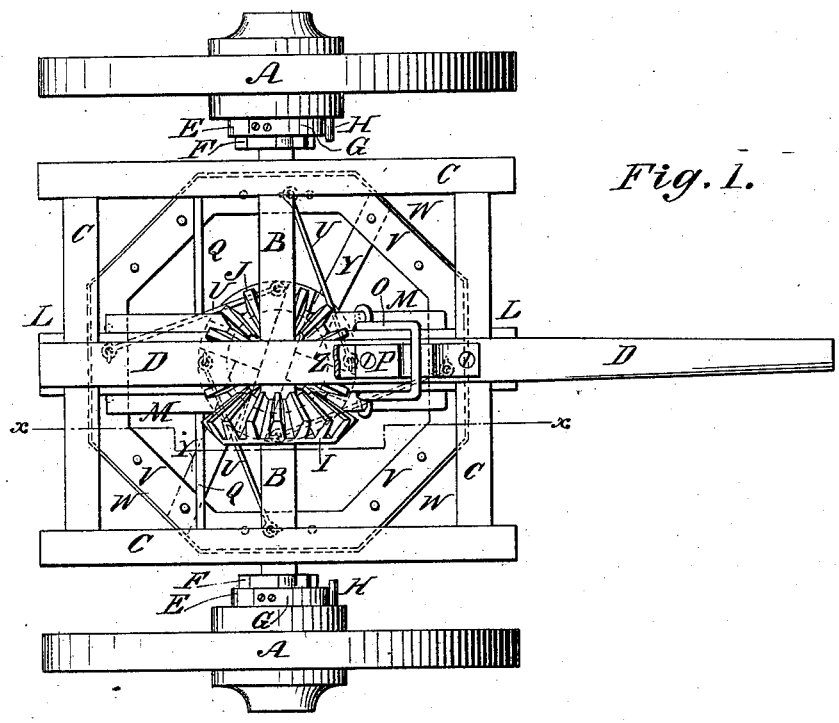
Figure 2:
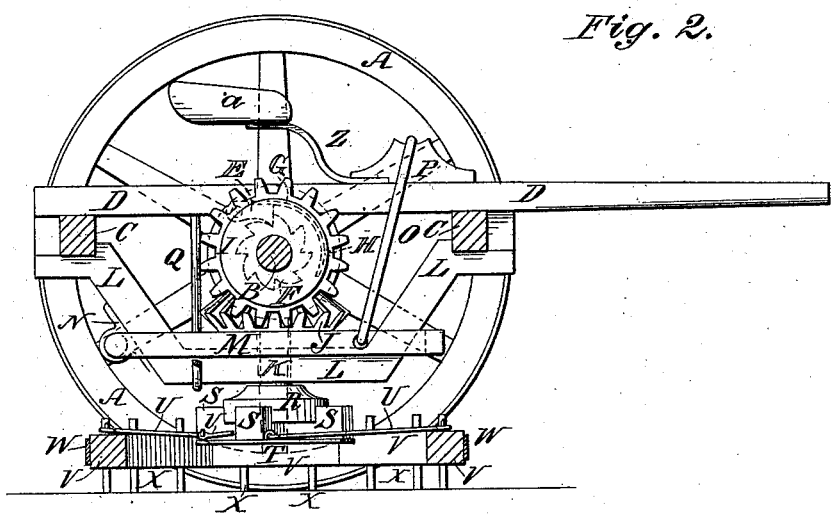
Figure 3:
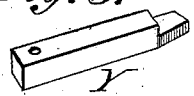

Figure 1 is a plan view of my improvement, the driver's seat being removed. Fig. 2 is a sectional side elevation of the same, taken through the line $x\ x$, Fig. 1. Fig. 3 is a perspective view of one of the bars for supporting the harrow-rim while taking the machine from place to place.

The object of this invention is to facilitate the operation of harrowing and promote thoroughness in said operation.

A represents the wheels, the axle B of which revolves in bearings attached to the side bars of the frame C.

To the centers of the front and rear cross-bars of the frame C is attached the tongue D.

The tires of the wheels A are designed to be corrugated or roughened, to prevent the said wheels from slipping upon the ground.

To the hubs of the wheels A are pivoted pawls E, which engage with ratchet-wheels F, attached to the axle B, so that the said wheels in their forward movement will carry the said axle with them, and so that one of the wheels can turn slower than the other—as, for instance, when turning around—without affecting the revolution of the axle. The pawls E are held against the ratchet-wheels F by springs G, attached at one end to the said pawls, and resting against pins H, attached to the ends of the wheel-hubs.

To the middle part of the axle B is attached a beveled gear-wheel, I, the teeth of which mesh into the teeth of the beveled gear-wheel J, attached to the upper end of a short vertical shaft, K. The shaft K revolves in bearings in the center of the horizontal middle part of the bar L, the end parts of which incline upward and outward, and are attached to the centers of the front and rear cross-bars of the frame C. The gear-wheel J rests and revolves upon the middle part of the link M, the rear end of which is hinged in a bearing, N, attached to the upwardly-inclined rear part of the bar L. The forward end of the link M passes around the upwardly-inclined forward part of the bar L, and to the forward part of the said link is hinged the bail or link O, which passes around the tongue D, and its upper end rests in the concaved upper side of the saddle-block P, attached to the upper side of the said tongue D. With this construction, when the bail O rests upon the saddle-block P, the wheel J will be raised into gear with the wheel I, and when the bail O is slipped off the saddle-block P the wheel J will be lowered out of gear with the wheel I. The bar L is strengthened in position by a brace-rod, Q, the middle part of which passes beneath the said bar, and its ends are attached to the side bars of the frame C.

To the lower end of the shaft K is keyed or otherwise secured a hub, R, to the lower side of which are attached the inner ends of a number of short radial bars, S.

To the lower side of the outer ends of the radial bars S is attached an annular bar or plate, T, to strengthen the said bars in position. To the rear sides of the outer ends of the radial bars S are hinged by eyebolts or other suitable means the inner ends of four or more rods, U, the outer ends of which are hinged by eyebolts or other suitable means to the harrow-frame V, so that the harrow-frame will be free to adjust itself to the surface of the ground. The harrow-frame V is made in the form of an octagonal rim, which is strengthened by an iron tire, W, passed around and fitted to it. The frame or rim V is provided with teeth X in the ordinary manner. With this construction, as the machine is drawn forward, the harrow-teeth X will be drawn forward through the soil, and at the same time the teeth will be made to move in cycloidal lines as the harrow-frame V is rotated by the gear-wheels I J, so that the soil will be thoroughly stirred.

Y is a bar, the outer end of which has a hole formed through it, and its inner end is halved, as shown in Fig. 3.

When the harrow is to be taken from place to place, the bail O is slipped off the saddle-block P, dropping the wheel J out of gear with the wheel I, and two or more bars, Y, are placed upon the annular plate T, with their halved inner ends beneath the hub R, and their outer ends beneath the frame or rim V of the harrow, one of the harrow-teeth, X, being passed through the hole in the end of each bar Y, so as to keep the said bar in place. By this arrangement the harrow-frame V will be supported with its teeth out of contact with the ground, so that the machine can be readily drawn from place to place.

To the tongue D, a little in front of the axle B, is attached the lower end of the curved standard Z, to the upper end of which is attached the driver's seat $a$.

If desired, the rim of the harrow-frame V may be made circular, and of one or more pieces.

Several harrow-frames can be connected with the same sulky-frame, in the manner hereinbefore described, to form a large or compound harrow.

Having thus described my invention, I claim as new and desire to secure by Letters Patent—

1. In a rotary sulky-harrow, the combination, with the sulky A B C, the bent bar L, and the harrow frame or rim V, of the gear-wheels I J, the center wheel, R S T, and the hinged rods U, substantially as herein shown and described.

2. In a rotary sulky-harrow, the combination, with the bent bar L, the tongue D, and the gear-wheel J, of the link M, the bail O, and the saddle-block P, substantially as herein shown and described, whereby the gear-wheels can be readily thrown into and out of gear, as set forth.

3. In a rotary harrow, the combination of the plate T, hub R, hinged rods U, and toothed rim V, adapted to receive the halved and apertured bars Y, so as to hold the teeth out of contact with the ground, substantially as shown and described.

WILLIAM HENRY SOUTHWARD.

Witnesses:
JESSE HARTZOG,
ELI MUMAUGH.